United States Patent
Kaneda (10) Patent No.: US 10,489,695 B2
(45) Date of Patent: Nov. 26, 2019

(54) PRINT CONTROL APPARATUS, AND PRINT CONTROL METHOD THAT SELECTIVELY RASTERIZE PRINT DATA

(71) Applicant: CANON KABUSHIKI KAISHA, Tokyo (JP)

(72) Inventor: Takeshi Kaneda, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/013,388

(22) Filed: Jun. 20, 2018

(65) Prior Publication Data
US 2018/0365540 A1 Dec. 20, 2018

Related U.S. Application Data (63) Continuation of application No. 15/177,200, filed on Jun. 8, 2016, now Pat. No. 10,019,661.

(30) Foreign Application Priority Data

Jun. 26, 2015 (JP) .................................. 2015-129202

(51) Int. Cl.
*G06F 15/00* (2006.01)
*G06F 3/12* (2006.01)
(Continued)

(52) U.S. Cl.
CPC ......... *G06K 15/1806* (2013.01); *G06F 3/124* (2013.01); *G06F 3/1215* (2013.01);
(Continued)

(58) Field of Classification Search
CPC ............. G06K 15/1806; G06K 15/181; G06K 15/1836; G06K 2215/0011; G06F 3/1215;
(Continued)

(56) References Cited

U.S. PATENT DOCUMENTS 5,555,099 A 9/1996 Telle
8,693,059 B2 4/2014 Boyes, Jr. et al.
(Continued)

FOREIGN PATENT DOCUMENTS

CN 101000535 A 7/2007
CN 101563668 A 10/2009
(Continued)

OTHER PUBLICATIONS

European Search Report dated Nov. 11, 2016, issued in corresponding European Patent Application No. 16174103.8.
(Continued)

*Primary Examiner* — Douglas Q Tran
(74) *Attorney, Agent, or Firm* — Venable LLP (57) ABSTRACT

A print control apparatus includes a network interface to receive, from an external device, print job data including a plurality of ordered separate document files and two sequential serial page numbers in the plurality of ordered separate document files for specifying sequential target pages to be printed. The print job data has been generated and sent by the external device. One of the two sequential serial page numbers indicates, as an initial page, a page of one of the plurality of ordered document files, and the other of the sequential serial page numbers indicates, as a last page, a page of another one of the plurality of ordered document files. A rasterizer rasterizes at least the sequential target pages specified by the two sequential serial page numbers, and does not rasterize one or more pages of one or more document files that do not include the sequential target pages.

16 Claims, 8 Drawing Sheets

(51) Int. Cl.
*G06K 1/00* (2006.01)
*G06K 15/02* (2006.01)
(52) U.S. Cl.
CPC .......... *G06F 3/1242* (2013.01); *G06F 3/1247* (2013.01); *G06F 3/1248* (2013.01); *G06F 3/1285* (2013.01); *G06K 15/181* (2013.01); *G06K 15/1836* (2013.01); *G06K 2215/0011* (2013.01)
(58) Field of Classification Search
CPC ...... G06F 3/124; G06F 3/1242; G06F 3/1247; G06F 3/1248; G06F 3/1285
USPC ................................ 358/1.1, 1.15, 1.18, 1.6
See application file for complete search history.

(56) References Cited

U.S. PATENT DOCUMENTS

| | | | |
|---|---|---|---|
| 9,164,709 | B2 | 10/2015 | Kaneda |
| 2003/0103071 | A1 | 6/2003 | Lusen et al. |
| 2007/0030507 | A1 | 2/2007 | Kaneko |
| 2007/0165248 | A1 | 7/2007 | Utsunomiya et al. |
| 2012/0033241 | A1 | 2/2012 | Park et al. |
| 2013/0070292 | A1 | 3/2013 | Ohkawa |
| 2015/0220820 | A1 | 8/2015 | Kaneda |

FOREIGN PATENT DOCUMENTS

| | | |
|---|---|---|
| JP | H04-143858 A | 5/1992 |
| JP | 2009-177492 A | 8/2009 |
| JP | 2010-208170 A | 9/2010 |
| JP | 2011-110900 A | 6/2011 |
| JP | 2013-061823 A | 4/2013 |

OTHER PUBLICATIONS

Microsoft: "How to print a range of pages in a multiple-section document in Word 2002", Jun. 12, 2015 (Jun. 12, 2015), XP055315361, retrieved from the Internet: https://support.microsoft.com/en-us/kb/290984#bookmark-2 (retrieved on Nov. 1, 2016).

Office Action dated Jan. 8, 2019, issued in Korean Patent Application No. 10-2016-0078339.

Chinese Office Action dated Mar. 26, 2019, in Chinese Patent Application No. 201610464359.3.

Office Action dated Feb. 15, 2019, issued in Japanese Patent Application No. 2015-129202.

PRINT CONTROL APPARATUS, AND PRINT CONTROL METHOD THAT SELECTIVELY RASTERIZE PRINT DATA

This application is a continuation of U.S. patent application Ser. No. 15/177,200, filed Jun. 8, 2016, which claims the benefit of Japanese Patent Application No. 2015-129202, filed Jun. 26, 2015, which are hereby incorporated by reference herein in their entirety.

BACKGROUND OF THE INVENTION

Field of the Invention

The present invention relates to a print control apparatus and a print control method.

Description of the Related Art

There is a function in which, in a case in which print data is transmitted to a printing apparatus from a host terminal, such as a PC or a mobile device, to cause the printing apparatus to print, it is possible to instruct a print page range by specifying pages, for example, on that host terminal. Also, when generating such print data on the host terminal, sometimes one print job includes a plurality of PDL files. In a case in which a print page range for a print job including a plurality of PDL files is specified in this way, pages to be printed and page numbers of documents corresponding to each PDL file and the entire print job cannot be specified at a stage of analyzing the PDL file. For this reason, even if the specified print page range is a part of the plurality of PDL files, for example, an analysis of PDL files and RIP processing are performed with respect to all pages of all files, and then, when printing, narrowing down to pages of the target range is first performed and then print processing is executed.

In Japanese Patent Laid-Open No. 2011-110900, a technique is recited for solving a problem in that, in direct printing of PDF (Portable Document Format) files, and the like, a total number of pages of print data cannot be displayed, and also, because of this problem, a specified page range cannot be printed. According to this technique, specific identifiers to be used in the calculation of the number of pages in the document from one or two or more print data items being stored in an external storage medium are extracted, and the total number of pages of a document is calculated based on the extracted identifiers.

With the above-described conventional technique, however, as previously mentioned, if a print page range is specified in relation to a print job including a plurality of files for which the total number of pages is unclear, the problem that it is necessary to execute PDL analysis and RIP processing in relation to pages outside of the print page range cannot be solved. In this way, conventionally, because PDL analysis and RIP processing have been executed in relation to pages outside the print target when a print page range is specified in relation to a print job including a plurality of files, there has been a problem in that unnecessary processing occurs when printing, and, as a consequence, the processing time increases.

SUMMARY OF THE INVENTION

An object of the present invention is to eliminate the above-mentioned problems that are found in the conventional technology.

A feature of the present invention is to provide a technique in which, even when a print page range is specified in relation to a print job including a plurality of files, printing can be performed with a shortened processing time.

According to a first aspect, the present invention provides a print control apparatus comprising a receiving unit configured to receive a print job with a print page range indicating target pages selected among all pages of the print job, the print job including a plurality of documents, the target pages including pages of different documents, and a rasterizing unit configured to selectively rasterize the received print job according to the print page range, so that the target pages are rasterized and pages among the all pages other than the target pages are not rasterized.

According to a second aspect, the present invention provides a print control method comprising receiving a print job with a print page range indicating target pages selected among all pages of the print job, the print job including a plurality of documents, the target pages including pages of different documents, and selectively rasterizing the received print job according to the print page range, so that the target pages are rasterized and pages among the all pages other than the target pages are not rasterized.

Further features of the present invention will become apparent from the following description of exemplary embodiments (with reference to the attached drawings).

BRIEF DESCRIPTION OF THE DRAWINGS

The accompanying drawings are incorporated in and constitute a part of the specification, illustrate embodiments of the invention, and, together with the description, serve to explain the principles of the invention.

DESCRIPTION OF THE EMBODIMENTS

Embodiments of the present invention will be described below in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
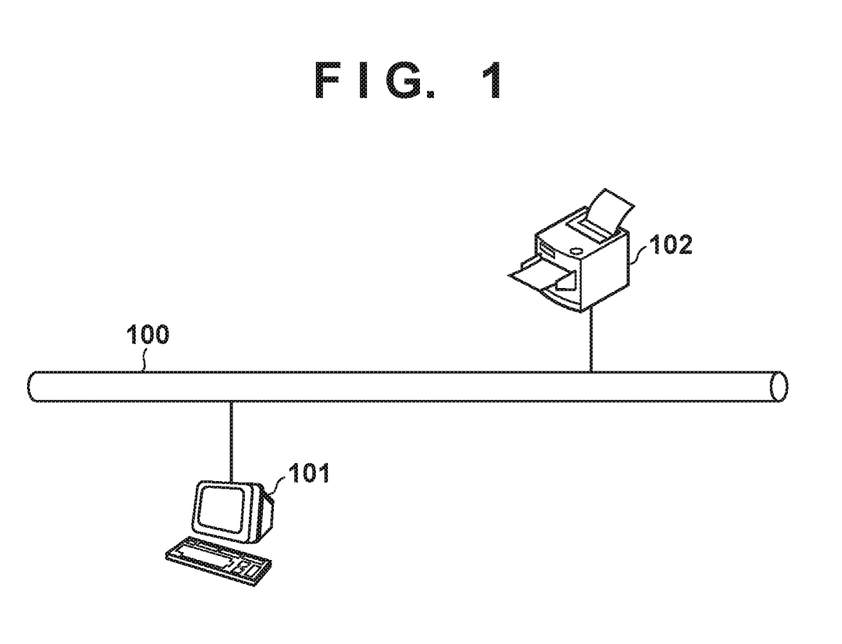
FIG. 1 depicts a view illustrating an example configuration of a print system according to an embodiment of the present invention.

FIG. 1 depicts a view illustrating an example configuration of a print system according to the embodiment of the present invention.

In the print system, a host terminal 101 that generates print data and supplies the print data to an image forming apparatus 102, and the image forming apparatus 102 that receives the print data and executes print processing based on the print data, are connected via a network 100.

Figure 2:
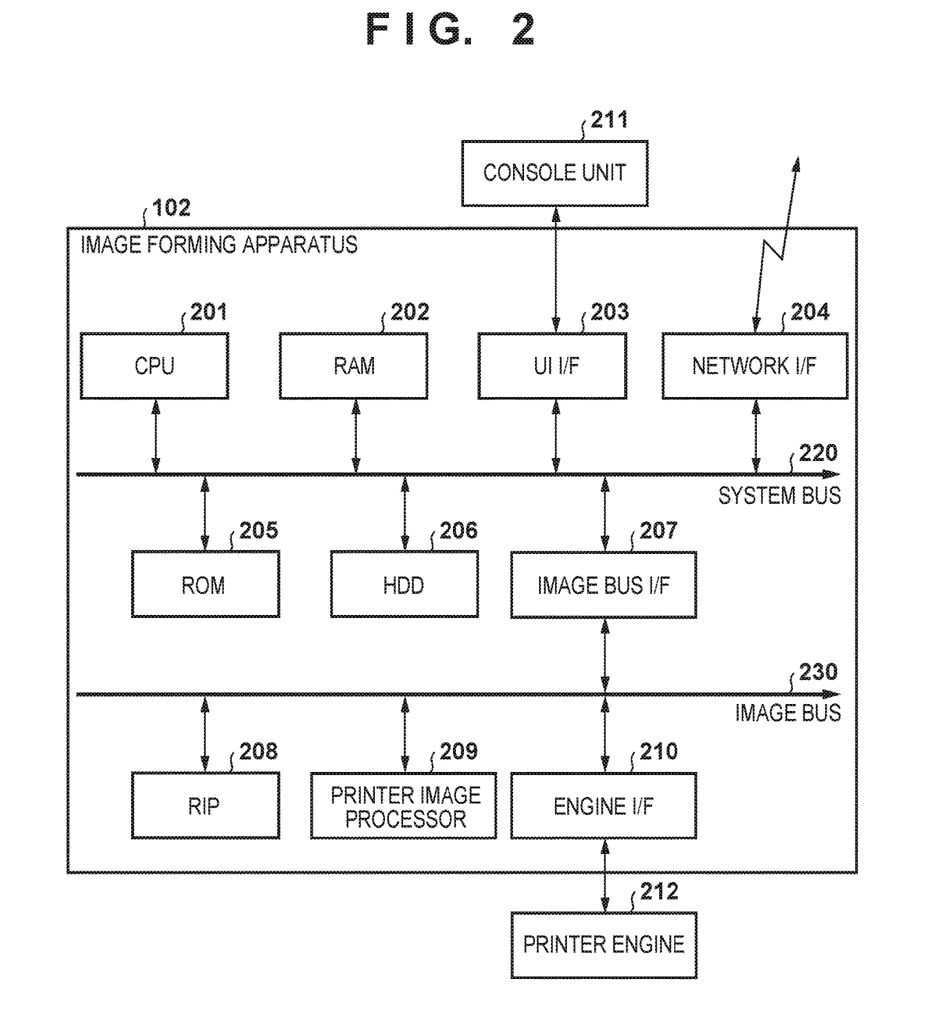
FIG. 2 is a block diagram for describing a hardware configuration of an image forming apparatus according to the embodiment.

FIG. 2 is a block diagram for describing a hardware configuration of the image forming apparatus 102 according to the embodiment.

To a system bus 220, a CPU 201, a RAM 202, a UI (user interface) I/F 203, a network I/F 204, a ROM 205, and an HDD (hard disk drive) 206 are connected and communication with each other. The components on the system bus 220, via an image bus I/F 207, access an RIP (Raster Image Processor) 208, a printer image processor 209, and an engine I/F 210 that are connected to an image bus 230. The UI I/F 203 is connected to a console unit 211 and notifies signals that are from the console unit 211 to each module. The network I/F 204 receives PDL (page description language) data from the host terminal 101 via the network 100, and the CPU 201 stores the PDL data to the HDD 206. The ROM 205 stores various parameters and programs necessary for execution of activation and processing of the image forming apparatus 102, and is accessed from each software module as necessary. The HDD 206 provides a temporary storage region for the PDL data received via the network 100, and a data swap region of the RIP 208 and the printer image processor 209. The image bus I/F 207 executes a data exchange between the image bus 230 and the system bus 220 of the image forming apparatus 102, and mediates communication between the system bus 220 on which control system software operates, and modules relating to image processing that operate on the image bus 230. The RIP 208 is connected to the image bus 230 and renders (converts) a page description language (PDL) code into an image file. The conversion is called rasterizing or rendering. The printer image processor 209 performs correction processing or a conversion to a resolution suited to a printer engine 212 in relation to the image file generated by the RIP 208. The engine I/F 210 is a communication I/F for controlling the printer engine 212.

Figure 3:
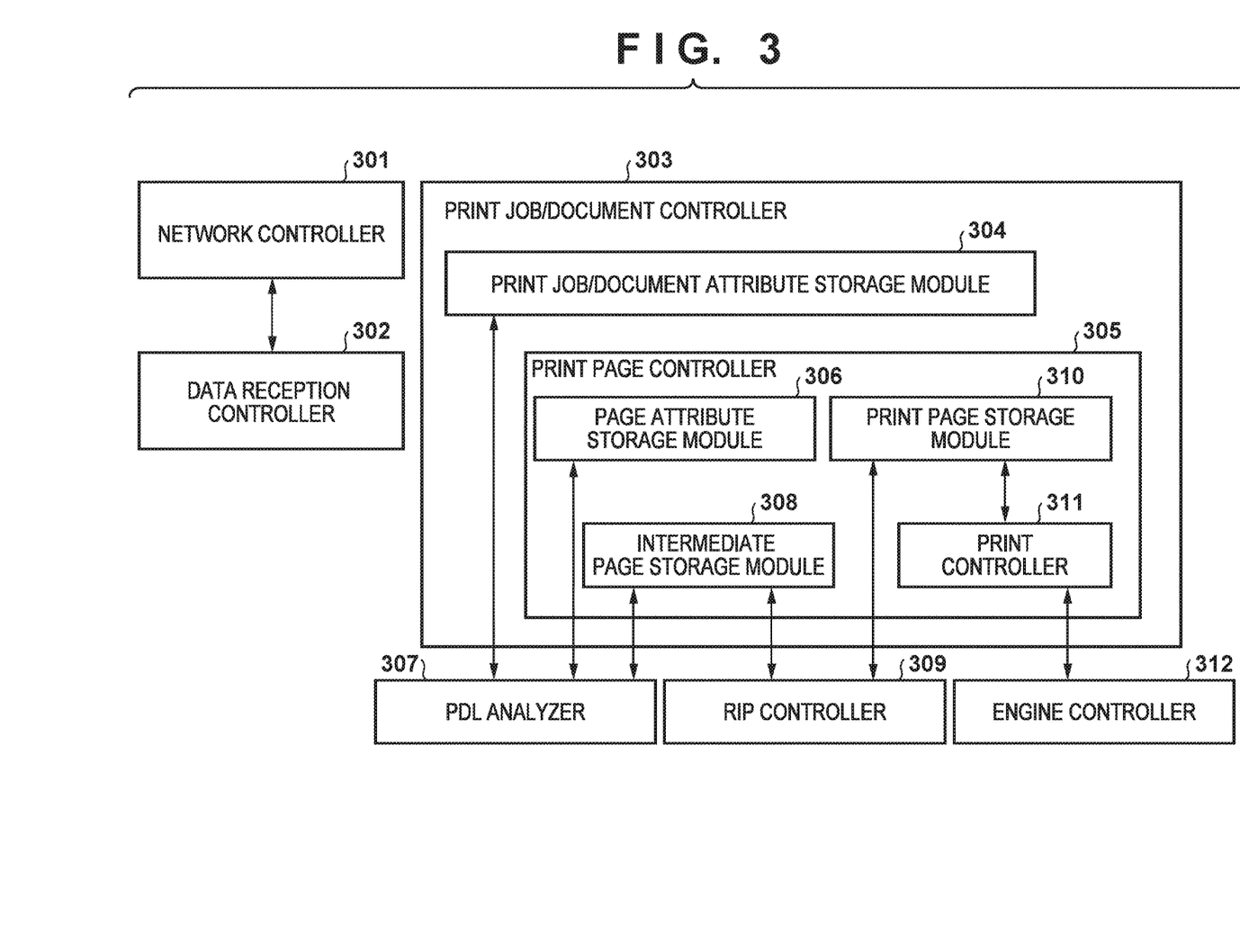
FIG. 3 is a functional block diagram for describing a software configuration of the image forming apparatus according to the embodiment.

FIG. 3 is a functional block diagram for describing a software configuration of the image forming apparatus 102 according to the embodiment. A function of each unit of FIG. 3 is realized by the CPU 201 executing a program deployed into the RAM 202 from the HDD 206 or the ROM 205.

The network I/F 204 provides a TCP/IP socket I/F to a network controller 301. An application that generates PDL data from the host terminal 101 side transmits PDF/PS/TIFF, etc., format data by a RAW/LPR, etc., data transmission protocol. In the image forming apparatus 102, the network controller 301 receives the PDF/PS/TIFF data by the RAW/LPR communication protocol, and passes the data to a data reception controller 302, and the data reception controller 302 writes and stores the data to the HDD 206. A print job/document controller 303 manages a sequence of processes from a reception of document data that configures the print job until a print completion. Here, when one job includes a plurality of document data items, and the documents are included in a print page range, a PDL analyzer 307 is caused to operate a plurality of times in units of documents. Also, a RIP controller 309 and a print controller 311 are caused to operate as necessary to create image data for printing. Also, the print job/document controller 303 reads and discards data stored by the data reception controller 302 through the PDL analyzer 307 if data of a processing target document is outside the print page range. Attribute information of the document and the job generated at the time of PDL analysis is stored in a print job/document attribute storage module 304. The page processing of each document (PDL analysis, RIP, and print control) is controlled by a print page controller 305.

The print job/document attribute storage module 304 receives setting information attached to the document and the print job from the print job/document controller 303, and stores the setting information in units of documents and in units of jobs. In this way, the stored information is referred to as necessary for job control and page control.

The print page controller 305, the PDL analyzer 307, the RIP controller 309 and the print controller 311 cooperate and perform processing pages included in the print page range. At that time, the page attribute, obtained when the page is analyzed, is stored in a page attribute storage module 306. The print page controller 305 receives an initiation notification of the document process from the PDL analyzer 307, requests a rendering process and a PDL analysis to the PDL analyzer 307, and stores intermediate page data to an intermediate page storage module 308 after the process has terminated. Continuing, the print page controller 305 requests for RIP processing to the RIP controller 309 and stores image data extracted by the RIP processing to a print page storage module 310 after termination of the RIP processing. Finally, the print controller 311 prints an image based on image data, for which RIP has completed, that is being stored in the print page storage module 310.

The page attribute storage module 306 receives page attributes obtained by the PDL analysis processing from the print page controller 305, and references these as necessary in accordance with requests from each module.

The PDL analyzer 307, in accordance with instructions of the print job/document controller 303, performs rendering processing and PDL analysis of received print jobs and generates the intermediate page data. Then, the PDL analyzer 307 generates a page attribute of each page and a document attribute of the document, and transfers those to the print job/document controller 303 and to the print page controller 305, respectively. Also, the PDL analyzer 307, by the print job/document controller 303, obtains information of the print page range Ds(N) through De(N) of an Nth document. If a page number(m) during the analysis is in the print page range Ds(N) through De(N), the PDL analysis processing is applied, and rendering processing of the intermediate data for RIP processing is performed. If the page number(m) is outside the print page range, however, only an obtainment of information necessary for the analysis of a subsequent page is performed, and the rendering processing is omitted. Also, by searching the information relating to a total number of pages of a document Da(N) from the PDL data, or by counting the total number of pages analyzed, a total number of pages of the received print job data is notified as Da(N) to the print job/document controller 303.

The intermediate page storage module 308 temporarily stores the intermediate page data for which the PDL analyzer 307 performed rendering until the RIP processing of the preceding page finishes. The RIP controller 309 performs RIP processing on the intermediate page data stored in the intermediate page storage module 308, stores the image data after the RIP processing in the print page storage module 310, and waits for the print processing by the print controller 311. The print controller 311 reads out the image data for printing in the print order from the print page storage module 310 then transfers to an engine controller 312 to cause printing.

Figure 4:
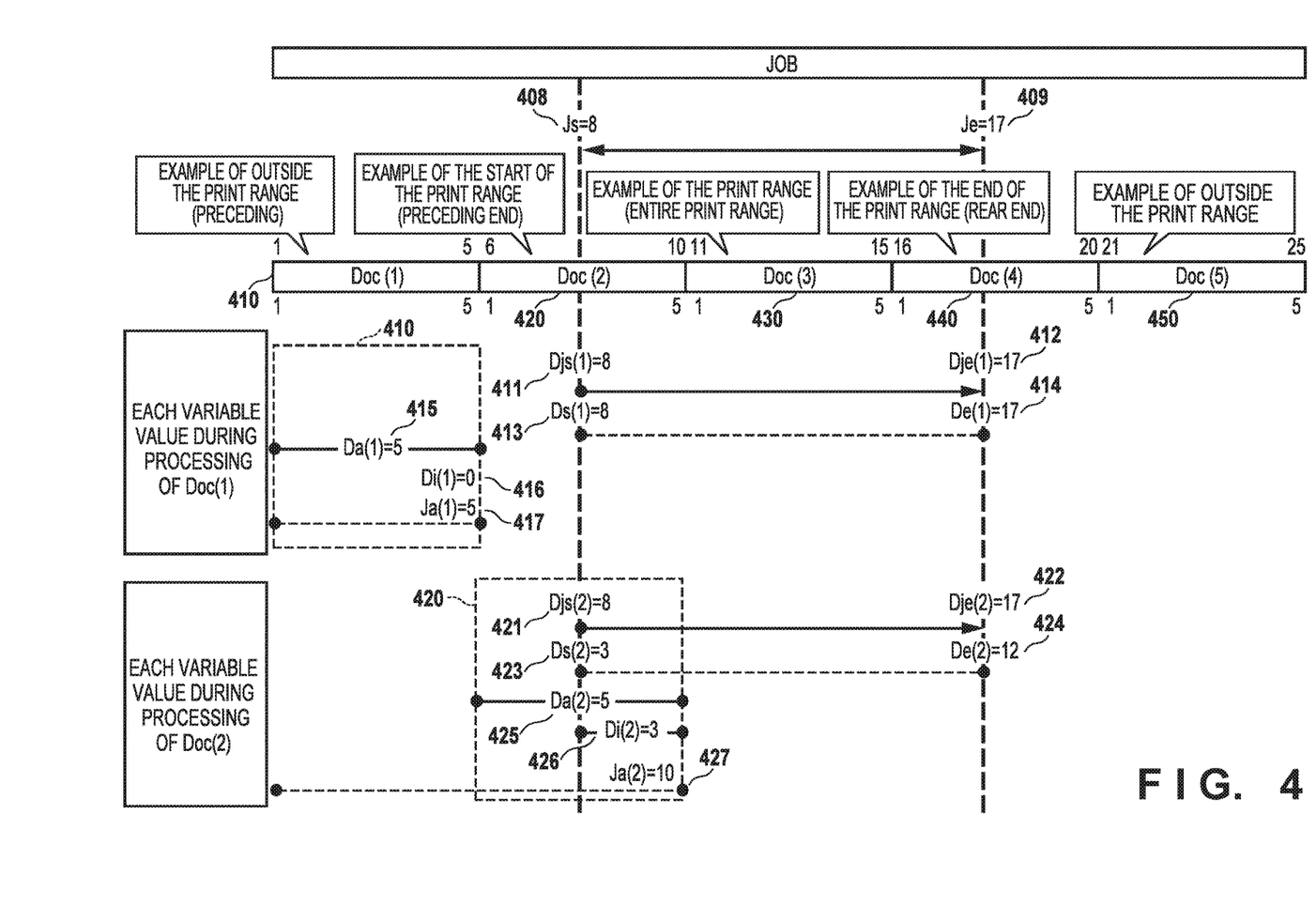
FIG. 4 and FIG. 5 depict views for describing a change of variables involved in an analysis of each document when the image forming apparatus according to the embodiment receives a print job that includes five documents, and a print page range is specified.
Figure 5:
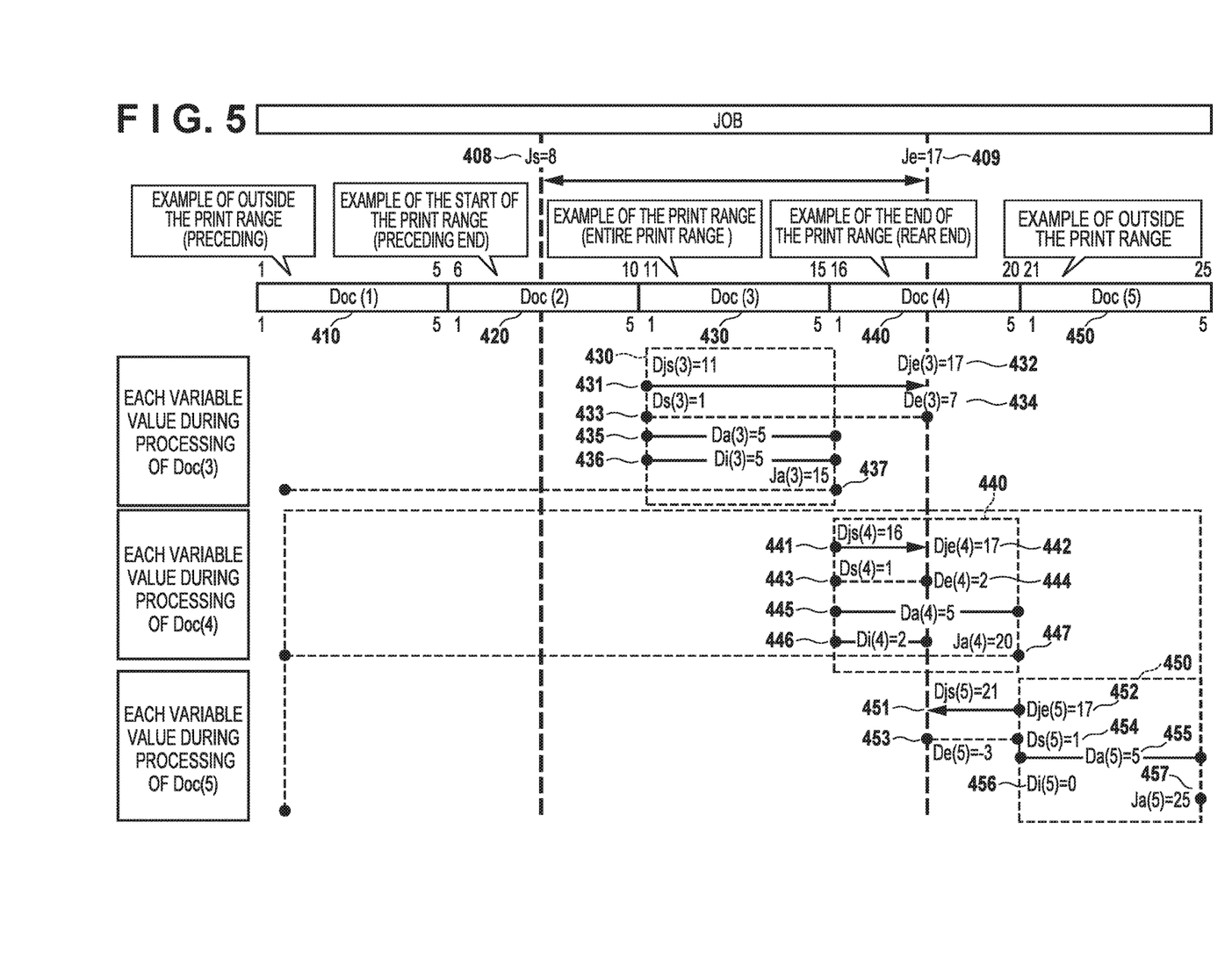

FIG. 4 and FIG. 5 depict views for describing a change of variables involved in an analysis of each document when the image forming apparatus 102 according to the embodiment receives a print job that includes five documents, and a print page range is specified.

One print job includes five PDL data items (documents (Doc (1)) through (Doc (5)) 410, 420, 430, 440, and 450) (Such as a PDF or a TIFF file), and each document is configured by five pages, and becomes document data of twenty-five (25) pages in the entire print job. A print page range of page eight (8) through page seventeen (17) is set for the print job. By this, the document 410 (Doc (1)) is a document before the print page range, and the document 420 (Doc (2)) is a document in which the head of the print page range is included. Furthermore, the document 430 (Doc (3)) is a document completely included in the print page range, the document 440 (Doc (4)) is a document in which the final page of the print page range is included, and the document 450 (Doc (5)) is a document outside the print page range. Note that a configuration may also be taken such that settings of the print page range are included in the print job, or such that a user can specify the settings via the console unit 211 of the image forming apparatus 102.

Here, the documents 410 (Doc (1)), 420 (Doc (2)), 430 (Doc (3)), 440 (Doc (4)), and 450 (Doc (5)) indicate the first through fifth documents. "An external input variable" and "an internal arithmetic variable" employed by the print job/document controller 303 and the PDL analyzer 307 that are necessary for when these first through fifth documents are processed are described.

Here, "external input variables" Js and Je that set the print page range are set as the print job settings. Here, Js, as denoted by reference numeral 408 in FIG. 4, denotes a print initiation page "8" in the print job, and Je, as denoted by reference numeral 409, denotes a print termination page "17" in the print job. Js and Je are job attribute values for when the host terminal 101 generates a print job, and the print job/document controller 303 of the image forming apparatus 102 references these attribute values.

In contrast, variables that are described later as items (A) through (H) are computed within the image forming apparatus 102. A parameter necessary for an Nth document process (in other words, processing of the subsequent document) is calculated based on Js, Je, and the variables for the time of the ((N−1)th) document one previous (in other words, the processing of the preceding document). A calculation equation is described as follows. The variables that are described by items (A) through (F) and (H) are values calculated by the print job/document controller 303, and the variable (variable De(N)) that is described by item (F) is obtained by the PDL analyzer 307. Note that these variables are stored in the RAM 202.

(A) Variable Ja(N) indicates the total number of pages of the first through Nth documents. For example, Ja(2) is a sum total of a number of pages of the first and second documents. The print job/document controller 303 calculates this variable by $Ja(N)=Ja(N-1)+Da(N)$ prior to Nth document processing initiation (step S604 of FIG. 6). Here Da(N) is a total number of pages of the Nth document.

In FIG. 4 and FIG. 5, Ja (total number of pages) of the first to fifth documents is denoted by each reference numeral 417 (Ja(1)=5), 427 (Ja(2)=10), 437 (Ja(3)=15), 447 (Ja(4)=20), 457 (Ja(5)=25).

(B) Variable Ji(N) indicates a sum total the pages to be printed of the first through Nth documents. The print job/document controller 303 calculates this variable by $Ji(N)=Ji(N-1)+Di(N)$ after the Nth document processing termination (step S609). Here, Di(N) is the total number of pages to be printed of the Nth document.

Variable Ji(N) for the first to fifth documents, after processing of the first through fifth documents, is Ji(1)=0, Ji(2)=3, Ji(3)=8, Ji(4)=10, and Ji(5)=10, respectively. Note, the variable Ji(N) is not indicated in FIG. 4 and FIG. 5.

(C) Variable Djs(N) indicates the print initiation page in units of jobs of the Nth document. The print job/document controller 303 calculates this variable prior to the Nth document processing initiation (step S604) by the following equation:

if $Ja(N-1)<Js$,(print initiation page), then $Djs(N)=Js$,
and if $Ja(N-1) \geq Js$, then $Djs(N)=Ja(N-1)+1$.

In FIG. 4 and FIG. 5, the variable Djs(N) of the first to fifth documents is denoted by each reference numeral 411 (Djs(1)=8), 421 (Djs(2)=8), 431 (Djs(3)=11), 441 (Djs(4)=16), and 451 (Djs(5)=21).

(D) Variable Dje(N) indicates the print termination page in units of jobs of the Nth document. The print job/document controller 303 calculates this variable by Dje(N)=Je(print termination page) prior to the Nth document processing initiation (step S604).

In FIG. 4 and FIG. 5, the variable Dje(N) of the first to fifth documents is denoted by each reference numeral 412 (Dje(1)=17), 422 (Dje(2)=17), 432 (Dje(3)=17), 442 (Dje(4)=17), and 452 (Dje(5)=17).

(E) Variable Ds(N) indicates the print initiation page in units of documents of the Nth document. The print job/document controller 303 calculates this variable by $Ds(N)=Ds(N-1)+Djs(N)$ prior to the Nth document processing initiation (step S604). In FIG. 4 and FIG. 5, the variable Ds(N) of the first to fifth documents is denoted by each reference numeral 413 (Ds(1)=8), 423 (Ds(2)=3), 433 (Ds(3)=1), 443 (Ds(4)=1), and 453 (Ds(5)=1).

(F) Variable De(N) indicates the print termination page in units of documents of the Nth document. The print job/document controller 303 calculates this variable by $De(N)=Je-Ja(N-1)$ prior to the Nth document processing initiation (step S604).

In FIG. 4 and FIG. 5, the variable De(N) of the first to fifth documents is denoted by each reference numeral 414 (De(1)=17), 424 (De(2)=12), 434 (De(3)=7), 444 (De(4)=2), and 454 (De(5)=−3).

(G) Variable Da(N) indicates the total number of pages of the Nth document. The PDL analyzer 307 analyzes the Nth document of a received print job, and obtains the total number of pages included in the print job. The total number of pages included in the print job is notified to the print job/document controller 303 in step S803 (FIG. 8) in the case of a PDF, and in step S815 (FIG. 8) in the case of a PS/TIFF. The print job/document controller 303, having received the notification, stores the notified value as Da(N), and uses the value Da(N) in a calculation of the number of pages (Ja(N)) of the entire print job. In FIG. 4 and FIG. 5, the variable Da(N) of the first to fifth documents is denoted by each reference numeral 415 (Da(1)=5), 425 (Da(2)=5), 435 (Da(3)=5), 445 (Da(4)=5), and 455 (Da(5)=5).

(H) Variable Di(N) indicates the number of pages in the print page range of the Nth document. The PDL analyzer 307 determines that the Nth document is within the print page range, the number of pages for which PDL analysis, RIP processing, the print process are performed are counted, and this is stored as Di(N) when processing is terminated for an Nth document by the print page controller 305. In FIG. 4 and FIG. 5, the variable Di(N) of the first to fifth documents is denoted by each reference numeral 416 (Di(1)=0), 426 (Di(2)=3), 436 (Di(3)=5), 446 (Di(4)=2), and 456 (Di(5)=0).

Figure 6:
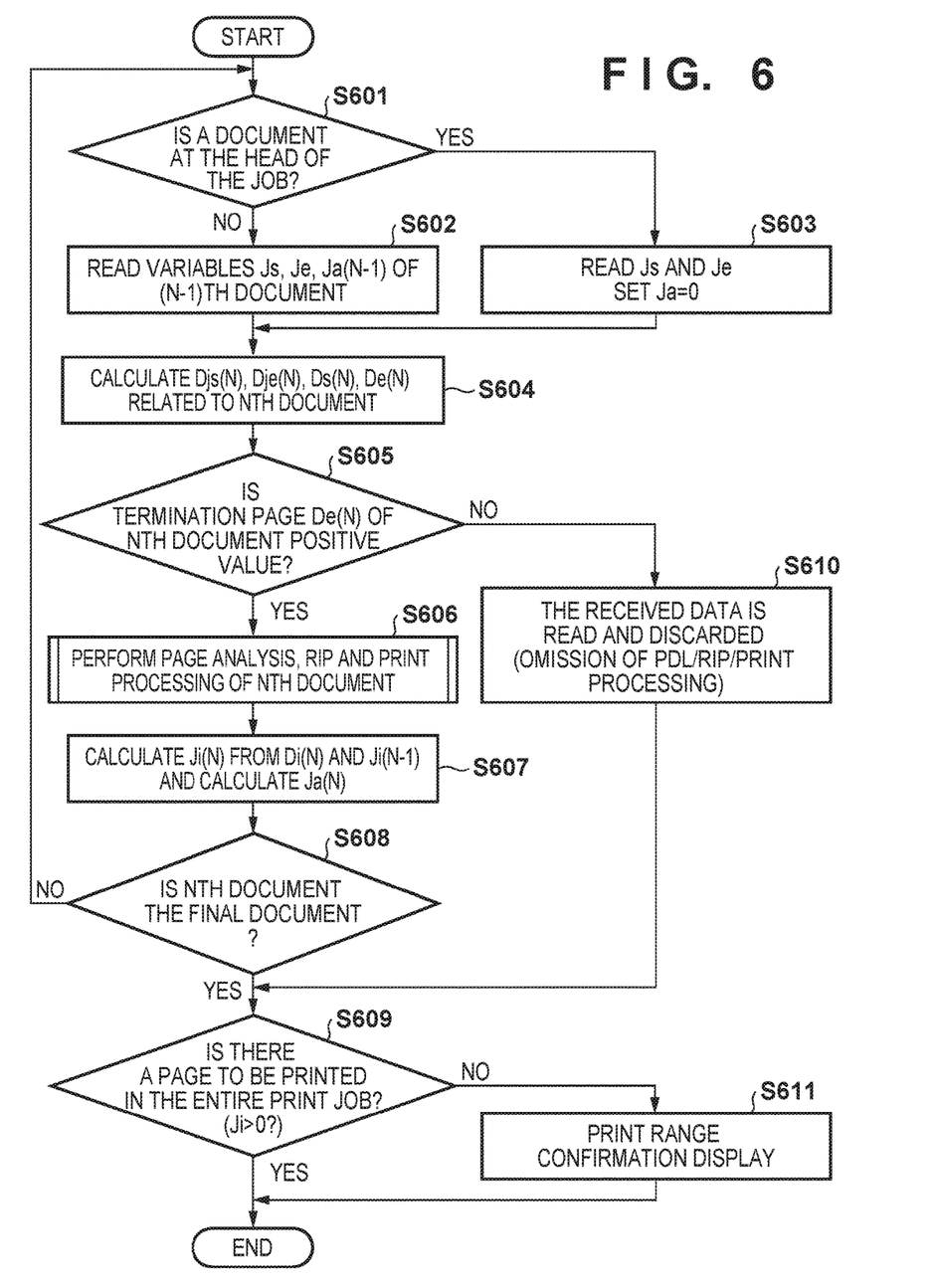
FIG. 6 is a flowchart for describing an analysis process of the print job in the image forming apparatus according to the embodiment.

FIG. 6 is a flowchart for describing print job analysis processing in the image forming apparatus 102 according to the embodiment. Note, a program for executing the process is saved to the ROM 205 or the HDD 206, and, when executed, realizes the processing described in the flowchart by being deployed in the RAM 202 and executed under the control of the CPU 201. The process is a process for calculating each kind of internal variable necessary for document processing and document processing of the print job/document controller 303. Here, the subject of the process is described as the CPU 201.

When the process is initiated, a variable N=1 is set. First, the CPU 201 in step S601, when processing of an Nth document is initiated, determines whether or not an (N−1)th document exists, in other words, whether or not the Nth document is the head document of the print job. When the Nth document is determined to be the head document, the processing proceeds to step S603, and, when the Nth document is determined not to be the head document, the processing proceeds to step S602. The CPU 201 in step S602 reads variables Js and Je when processing of the Nth document is initiated, and also reads the value of Ja(N−1) (the total number of pages until the (N−1)th document) for when the (N−1)th document was processed, and the processing proceeds to step S604. Here, the variables Js and Je are the print initiation page and the print termination page, respectively. When the head document is determined in step S601, however, an initial value "0" is set to Ja(N), and the values above described of variables Js and Je are read in step S603, and the processing proceeds to step S604.

In step S604, at a time of Nth document processing initiation, the CPU 201 calculates the variables Djs(N), Dje(N), Ds(N), and De(N) for the Nth document by the previously-described calculation equation. Here, Djs(N) and Dje(N) are, respectively, the print initiation page and the print termination page of units of jobs of the Nth document, and Ds(N) and De(N) are the print initiation page and the print termination page in units of documents of the Nth document, respectively. Next, the processing proceeds to step S605, and the CPU 201 references De(N) obtained in step S604. If De(N)>0, then the processing proceeds to step S606, and, if De(N)≤0, then the processing proceeds to step S610 since De(N) is outside the print page range, the document data is read and discarded, and the processing proceeds to step S609.

The CPU 201, in step S606, performs document page processing of the Nth document. Details of the document page processing are described later with reference to the flowchart of FIG. 7.

Next, the processing proceeds to step S607, and the CPU 201 calculates Ji(N) (total number of pages to be printed from the first to the Nth documents) and Ja(N) (a total number of pages of the first to Nth documents), and the processing proceeds to step S608. In step S608, the CPU 201 terminates the processing of the Nth document, determines whether or not the Nth document is the final document, and, in a case that the Nth document is not the final document, "1" is added to the variable N, the processing returns to step S601, and the previously-described processing is executed.

When the Nth document is determined to be the final document, however, the processing proceeds to step S609 and the CPU 201 calculates Ji (a number of pages to be printed of the entire job), and whether Ji>0. In other words, the CPU 201 determines whether there is a page to be printed. When a page to be printed exists, the processing terminates, and, when a page to be printed does not exist, the processing proceeds to step S611 and the CPU 201 displays that there are no pages to be printed on the console unit 211. In other words, the number of pages in the print page range is "0", and the processing is terminated.

Figure 7:
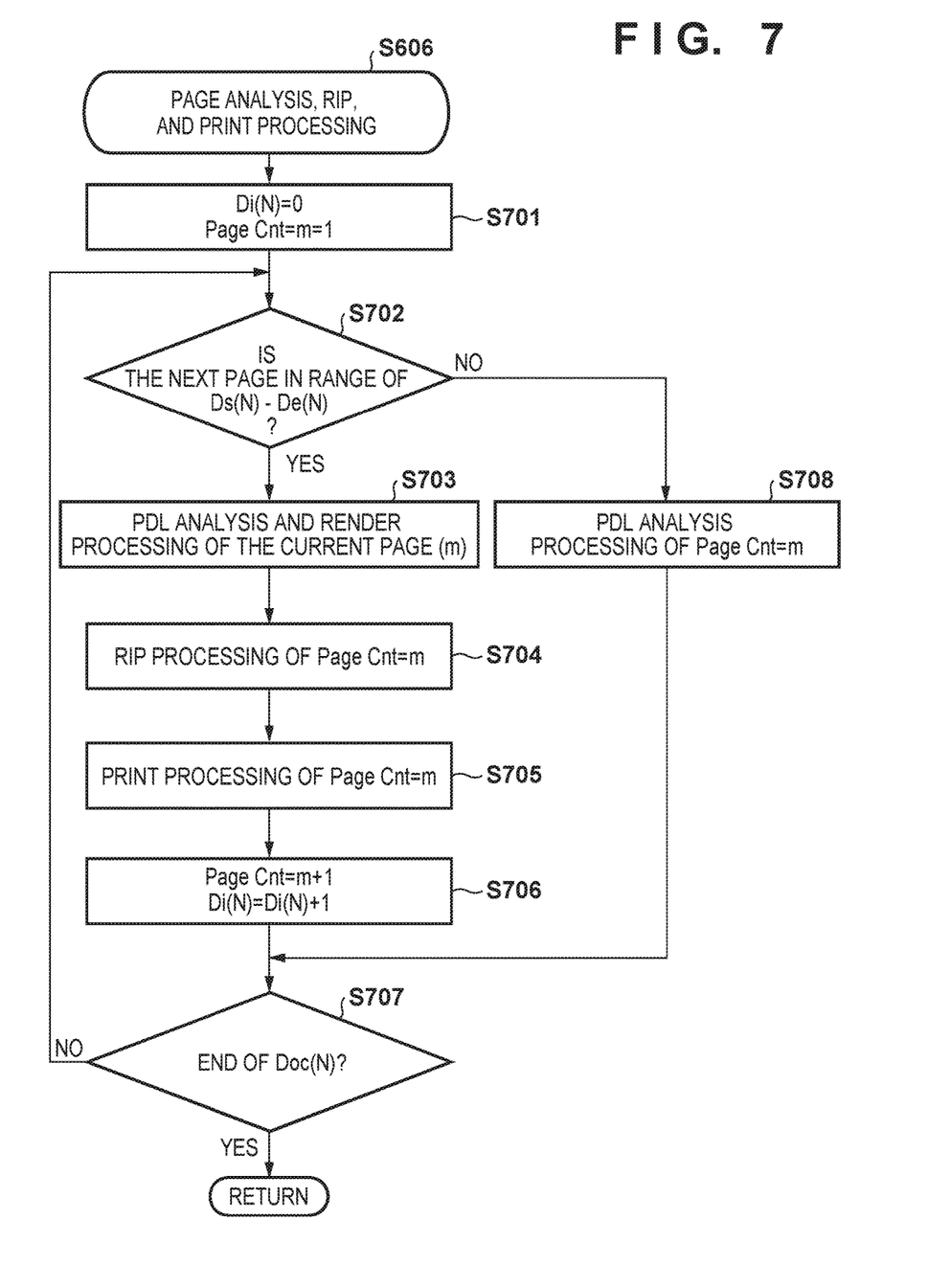
FIG. 7 is a flowchart for describing a process of step S606 of FIG. 6.

FIG. 7 is a flowchart for describing a process of step S606 of FIG. 6.

First, in step S701, the CPU 201 initializes the number Di(N) of pages to be printed of Nth document to "0", and initializes a value(m) of the page number (Page Cnt) that is subsequently processed in the Nth document N, to "1". Next, the processing proceeds to step S702, and the CPU 201, in regards to the Nth document, determines whether the next to be processed page number(m) is within the range of Ds(N) through De(N), or, in other words, whether the next to be processed page number(m) is included in the print page range. When it is determined that that the next to be processed page number(m) is included in the print page range, the processing proceeds to step S703, and the CPU 201 performs the PDL analysis and the rendering processing of the page(m), and the processing proceeds to step S704. In step S704, the CPU 201 performs RIP processing of the page(m), and the processing proceeds to step S705, and outputs the image data of the page(m) to the printer engine 212 via the engine I/F 210 to print. Next, the processing proceeds to step S706, and the CPU 201 increments the target page number(m) in the print page range of the Nth document, and stores the target page number(m) in Di(N), and the processing proceeds to step S707. The CPU 201, in step S707, determines whether printing of all pages of the Nth document has terminated, and, if the CPU 201 determines that printing has terminated, then this processing terminates. Otherwise, if subsequent pages exist, then the processing proceeds to step S702.

Also, in regards to the Nth document, if it is determined in step S702 that the next to be processed page number(m) is not included in the print page range, then the processing proceeds to step S708. The CPU 201, in step S708, performs only the PDL analysis processing because the page(m) is not included in the pages to be printed, and "1" is added to the page number(m). Then, PDL rendering processing (step S703), the RIP processing (step S704), and the print processing (step S705) are skipped, and the processing proceeds to step S707.

In this way, it is possible that only image data of a page of the document included in the print page range is extracted and printed.

Figure 8:
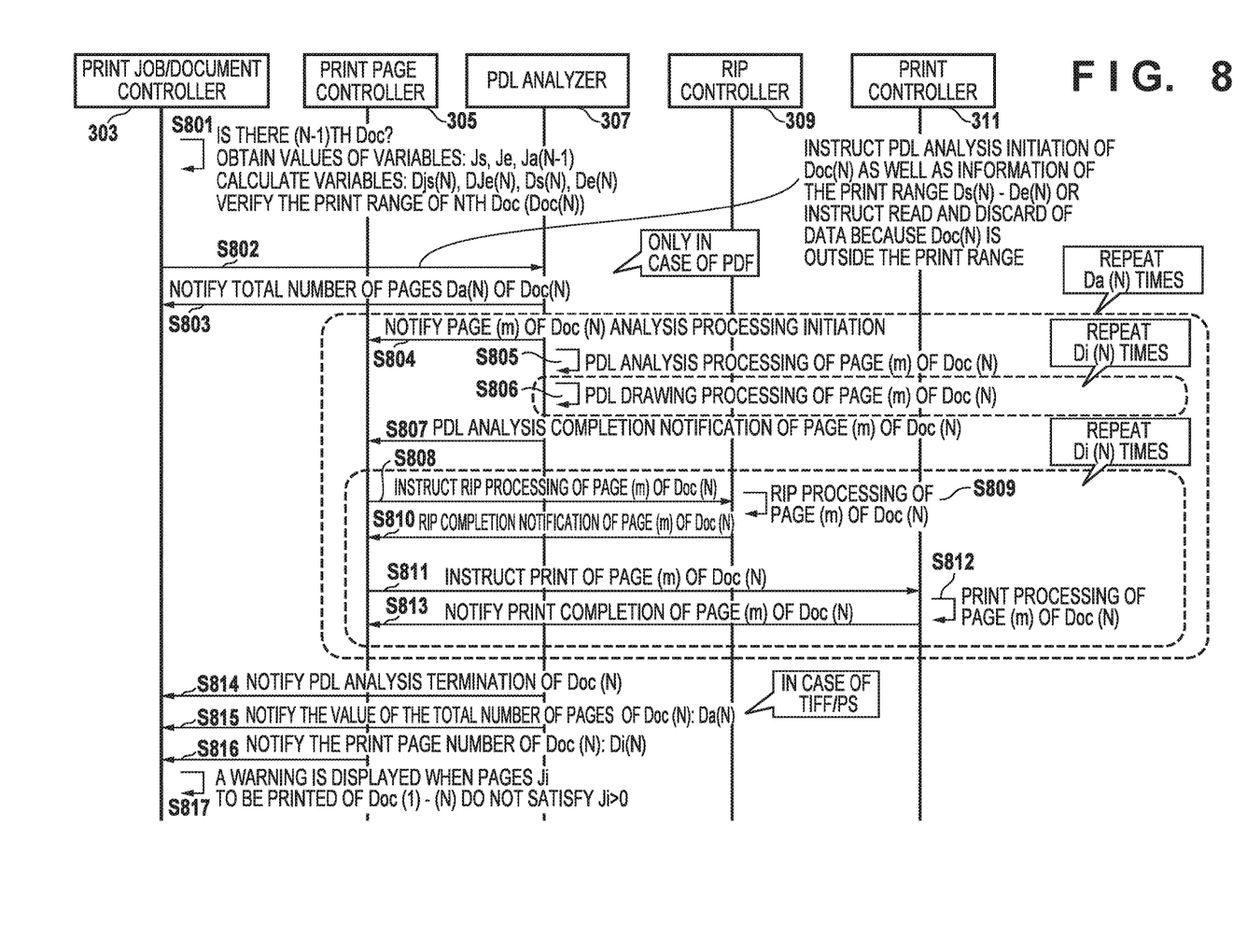
FIG. 8 depicts a view for describing a processing sequence of a print job/document controller, a print page controller, a PDL analyzer, a RIP controller, and a print controller of the image forming apparatus according to the embodiment.

FIG. 8 depicts a view for describing a processing sequence of the print job/document controller 303 of the image forming apparatus 102, the print page controller 305, the PDL analyzer 307, the RIP controller 309, and the print controller 311 according to the embodiment.

Step S801 indicates internal processing of the print job/document controller 303 and corresponds to step S601 through step S604 of FIG. 6. Here, it is determined whether the Nth document is the head document, the variables Js (print initiation page) and Je (print termination page) are read, and also the value of Ja(N−1) (the total number of pages until the (N−1)th document) when the (N−1)th document is processed is read. Additionally, the variables Djs(N), Dje(N), Ds(N), and De(N) are calculated for the Nth document. Also, the print page range of the Nth document is verified.

Next, in step S802, PDL analysis processing of the Nth document (Doc(N)) is instructed from the print job/document controller 303 to the PDL analyzer 307 with Ds(N) and De(N) as the print page range of the Nth document. Also, if the Nth document is outside the print page range, the document data is instructed to be read and discarded. At that time, only if the data format of the PDL analysis target of the document data is PDF, the PDL analyzer 307 notifies "the total number Da(N) of pages of the Nth document" to the print job/document controller 303 at a timing of step S803. This value is used for the calculation of the number Ja(N) of pages of the entire print job in step S607 of FIG. 6. In the case of data format (such as PS or TIFF) of the analysis target other than PDF, however, the PDL analyzer 307 notifies the total number Da(N) of pages of the Nth document to the print job/document controller 303 at a timing of step S815.

The PDL analyzer 307, in step S804, notifies processing initiation relating to the page(m) of the Nth document to the print page controller 305. Then, the PDL analyzer 307, in step S805, performs the PDL analysis processing of the page(m). Next, in step S806, only in a case of the page(m) being included in a print page range specification Ds(N) through De(N), the rendering processing of the page(m) is performed. The processing is repeatedly executed for the number of pages Di(N) within the print page range of the Nth document.

Next, in step S807, completion of the PDL analysis processing of the page(m) is notified to the print page controller 305 from the PDL analyzer 307. Furthermore, only in a case of the page number(m) being included in a print page range Ds(N) through De(N), the RIP processing in step S808 through step S810 and the print processing in step S811 through step S813 are performed.

Specifically, the RIP processing is instructed to the RIP controller 309 from the print page controller 305 in step S808, and the RIP controller 309 performs the RIP processing of the page(m) in step S809. Then, in step S810, completion of the RIP processing is notified to the print page controller 305 from the RIP controller 309. Then, the printing of the page(m) of the Nth document is instructed to the print controller 311 from the print page controller 305 in step S811, and the print controller 311 executes the print process of the page(m) in step S812. Then, the print controller 311 notifies the print completion of the page(m) of the Nth document to the print page controller 305 in step S813.

Next, the PDL analyzer 307 notifies a termination of analysis of the Nth document to the print job/document controller 303 in step S814. Then, in step S816, the print job/document controller 303 calculates the pages Ji to be printed regarding the entire print job, and if Ji>0 is not satisfied, in step S817, the print job/document controller 303 warns the user that there are no pages to be printed.

By virtue of this embodiment as explained above, the PDL analysis and rendering, RIP, and print processing are executed for the pages of the document included in the print page range, and the PDL rendering, RIP, and print processing are omitted for the pages outside the print page range. In other words, only the PDL analysis is executed for the pages outside the print page range. Further, the data itself is read and discarded (discarded) and the PDL analysis processing is also omitted for a document not included in the print page range. Thus, in the example above, since the PDL rendering, RIP, and print processing are performed only for the pages within the print page range of the second document 2 through the fourth document, there is the effect that the processing time of the entire job can be shortened when the print page range is specified for a print job that includes a plurality of documents as in the problem to be solved.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer-executable instructions from the storage medium to perform the functions of one or more of the above-described embodiments, and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A print control apparatus comprising:
a network interface configured to receive, from an external device, print job data including (i) a plurality of ordered document files and (ii) page numbers for specifying sequential target pages to be printed, among all pages of the plurality of the ordered document files in the print job data, wherein the print job data has been generated by the external device; and
a rasterizer configured to rasterize at least the sequential target pages specified based on the page numbers included in the received print job data and at least a total number of pages of a document file, of the plurality of document files,
wherein, in a case in which at least one page of a document file, of the plurality of the ordered document files, is not included in the sequential target pages, the rasterizer does not rasterize the at least one page, and
wherein the sequential target pages that have been rasterized by the rasterizer are printed and the at least one page, which is not included in the sequential target pages, is not printed.

2. The print control apparatus according to claim 1, wherein the print job data includes document files in different file formats.

3. The print control apparatus according to claim 1, further comprising a printer engine that prints the sequential target pages that have been rasterized by the rasterizer.

4. The print control apparatus according to claim 1, wherein, in order to rasterize the sequential target pages, the rasterizer is configured:
(a) to generate a document file page range for each document file, of the plurality of ordered document files, based on the sequential serial page numbers; and
(b) to control, for each document file, of the plurality of ordered document files, rasterization of pages of the document file based on the corresponding generated document file page range.

5. The print control apparatus according to claim 1, wherein the network interface receives the print job data including the plurality of ordered document files with which respective print page ranges are not associated.

6. The print control apparatus according to 1, wherein, in the rasterization of the sequential target pages, the rasterizer is configured:
(a) not to rasterize one or more pages that precede the sequential target pages, of the plurality of ordered document files;
(b) to rasterize the sequential target pages; and
(c) not to rasterize one or more pages that succeed the sequential target pages, of the plurality of ordered document files.

7. A print control method comprising:
generating, by an information processing apparatus, print job data including (i) a plurality of ordered document files and (ii) page numbers for specifying sequential target pages to be printed, among all pages of the plurality of the ordered document files in the print job data;
receiving, by a print control apparatus, the print job data generated by the information processing apparatus; and
rasterizing at least the sequential target pages specified based on the page numbers included in the received print job data and at least a total number of pages of a document file, of the plurality of the ordered document files,
wherein, in a case in which at least one page of a document file, of the plurality of the ordered document files, is not included in the sequential target pages, the at least one page is not rasterized, and
wherein the sequential target pages that have been rasterized by the rasterizing are printed and the at least one page which is not included in the sequential target pages is not printed.

8. The print control method according to claim 7, wherein the print job data includes document files in different file formats.

9. The print control method according to claim 7, further comprising printing the sequential target pages that have been rasterized by the rasterizing.

10. The print control method according to claim 7, wherein the rasterizing includes:
(a) generating a document file page range for each document file, of the plurality of ordered document files, based on the sequential serial page numbers; and
(b) controlling, for each document file, of the plurality of ordered document files, rasterization of pages of the document file based on the corresponding generated document file page range.

11. The print control method according to claim 7, wherein the received print job data includes the plurality of ordered document files with which respective print page ranges are not associated.

12. The print control method according to 7, wherein:
(i) one or more pages that precede the sequential target pages, of the plurality of ordered document files are not rasterized;
(ii) the sequential target pages are rasterized; and
(iii) one or more pages that succeed the sequential target pages, of the plurality of ordered document files, are not rasterized.

13. A print apparatus comprising:
a network interface configured to receive print job data having been generated by an external apparatus, wherein the print job data includes a plurality of document files and a print page range for specifying target pages to be printed;
a rasterizer configured to, in a case that a document file corresponding to a start page of the print page range is different from a document file corresponding to an end page of the print page range, (i) rasterize at least plural pages from a page included in the document file corresponding to the start page to a page included in the document file corresponding to the end page, and (ii) not to rasterize at least one or more pages included in one or more preceding document files preceding the document file including the start page and one or more pages included in one or more following document files following the document file including the end page of the plurality of separate document files; and
a printer configured to print pages, rasterized by the rasterizer, from the start page to the end page,
wherein one or more pages that are included in the plurality of document files, other than the print page range, are not printed.

14. The print apparatus according to claim 13, wherein the rasterizer includes at least one processor.

15. The print apparatus according to claim 13, further comprising a generator configured to generate, based on the print page range included in the print job data, one or more rasterization page ranges for respective document files corresponding to the print page range,
wherein the rasterizer rasterizes the plural pages based on the generated one or more rasterization page ranges.

16. The print apparatus according to claim 15, wherein the generator generates a rasterization page range for a current document file based on the print page range and a total number of pages of one or more preceding document files that precede the document file.

* * * * *